US009358892B1

(12) United States Patent
Gaither

(10) Patent No.: US 9,358,892 B1
(45) Date of Patent: Jun. 7, 2016

(54) SYSTEM AND METHOD FOR PRE-CHARGING A HYBRID VEHICLE FOR IMPROVING REVERSE DRIVING PERFORMANCE

(71) Applicant: Toyota Motor Engineering & Manufacturing North America, Inc., Erlanger, KY (US)

(72) Inventor: Geoffrey D. Gaither, Nagoya (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 28 days.

(21) Appl. No.: 14/558,596

(22) Filed: Dec. 2, 2014

(51) Int. Cl.
*B60L 9/00* (2006.01)
*B60L 11/00* (2006.01)
*B60L 11/18* (2006.01)
*G01C 21/26* (2006.01)
*B60K 35/00* (2006.01)
*B60W 20/00* (2016.01)

(52) U.S. Cl.
CPC ............ *B60L 11/1809* (2013.01); *B60K 35/00* (2013.01); *B60L 11/1861* (2013.01); *G01C 21/26* (2013.01); *B60K 2350/1076* (2013.01); *B60W 20/00* (2013.01)

(58) Field of Classification Search
USPC ................. 701/22; 903/930; 290/45; 307/46; 320/104; 180/65.27, 65.28
See application file for complete search history.

(56) References Cited

U.S. PATENT DOCUMENTS 5,856,709 A 1/1999 Ibaraki et al.
6,409,623 B1 6/2002 Hoshiya et al.
6,540,035 B2 4/2003 Nagano et al.
6,962,545 B2 11/2005 Larkin
7,101,298 B2 9/2006 Sowul et al.
7,285,869 B2 10/2007 Syed et al.

(Continued)

FOREIGN PATENT DOCUMENTS

JP 2007-186048 7/2007
JP 2010-173361 8/2010

(Continued)

OTHER PUBLICATIONS

Route profile analysis to determine suitability of electric postal delivery vehicles; Walter, C.E.; Kong, M.K.; Mullenhoff, D.J. Vehicular Technology Conference, 1982. 32nd IEEE; Year: 1982, vol. 32; pp. 26-39, DOI: 10.1109/VTC.1982.1622998.*

(Continued)

*Primary Examiner* — Cuong H Nguyen
(74) *Attorney, Agent, or Firm* — Snell & Wilmer LLP

(57) ABSTRACT

A method/system is provided for improving reverse hill climb performance of a hybrid vehicle. An electronic control unit (ECU) determines whether pre-charging is needed based on vehicle state and environmental conditions. This determination can be based on a grade value of a hill upon which the vehicle is positioned, a state of charge (SOC) of the battery, and/or the expected distance that the vehicle will travel uphill. The ECU sets a charging rate and a target charge value based on the foregoing data. The battery may be charged to have an SOC that exceeds an actual needed target charge value by a hysteresis margin. A message may be displayed requesting the driver to wait until pre-charging is complete. The engine charges the battery at the charging rate until the SOC reaches the target charge value. The driver is prompted that he or she can start reverse driving.

20 Claims, 6 Drawing Sheets

(56) References Cited

U.S. PATENT DOCUMENTS

| | | | |
|---|---|---|---|
| 7,653,474 B2* | 1/2010 | Cawthorne | B60K 6/40 123/406.12 |
| 7,772,799 B2* | 8/2010 | Wu | B60L 3/0046 320/104 |
| 7,935,022 B2 | 5/2011 | Iwase et al. | |
| 8,033,954 B2 | 10/2011 | Theobald et al. | |
| 8,467,924 B2* | 6/2013 | Shiba | B60K 6/445 290/40 C |
| 8,541,915 B2* | 9/2013 | Burns | H02K 5/20 310/54 |
| 8,672,805 B2 | 3/2014 | Akebono et al. | |
| 8,721,491 B2 | 5/2014 | Wittkopp et al. | |
| 9,231,282 B2* | 1/2016 | Yebka | H01M 10/44 |
| 2007/0080662 A1* | 4/2007 | Wu | B60L 3/0046 320/110 |
| 2012/0104883 A1* | 5/2012 | Burns | H02K 5/20 310/54 |
| 2014/0008976 A1* | 1/2014 | Yebka | H01M 10/44 307/23 |
| 2015/0006008 A1* | 1/2015 | Wei | B60L 11/1816 701/22 |

FOREIGN PATENT DOCUMENTS

| | | | | |
|---|---|---|---|---|
| JP | 2010-195255 | | 9/2010 | |
| JP | 2010-241385 | | 10/2010 | |
| WO | WO2009/157308 | * | 12/2009 | B60K 6/445 |

OTHER PUBLICATIONS

Evaluation of electric range demands of EV and EREV on the basis of field test data; Spichartz, P.; Dost, P.; Sourkounis, C. Electrical Systems for Aircraft, Railway, Ship Propulsion and Road Vehicles (ESARS), 2015 International Conference on Year: 2015; pp. 1-6, DOI: 10.1109/ESARS.2015.7101505.*

Electric transit bus for variable grade terrain; Baker, B.C.; Faddis, T.N.; Strunk, G.P.; Electric Vehicle Conference (IEVC), 2012 IEEE International ; Year: 2012; pp. 1-5, DOI: 10.1109/IEVC.2012. 6183200.*

Modeling of a Series Hybrid Electric High-Mobility Multipurpose Wheeled Vehicle; Ducusin, M.; Gargies, S.; Chunting Mi Vehicular Technology, IEEE Transactions on; Year: 2007, vol. 56, Issue: 2; pp. 557-565, DOI: 10.1109/TVT.2006.889575.*

* cited by examiner

SYSTEM AND METHOD FOR PRE-CHARGING A HYBRID VEHICLE FOR IMPROVING REVERSE DRIVING PERFORMANCE

BACKGROUND

1. Field

The present invention relates to methods and systems for managing a charging operation of a hybrid vehicle.

2. Description of the Related Art

With, growing environmental awareness and concerns for energy efficiency, demand for various forms of hybrid vehicles that utilize non-fuel energy has significantly increased. Movement of a hybrid vehicle and/or operation of its units may be powered, wholly or in part, by electrical power stored in one or more batteries. The batteries are used to power the hybrid vehicle when the engine is turned off. As one might expect, a hybrid vehicle travelling up a steep hill will generally require more electrical power from the batteries than when travelling on a flat smooth road. In certain conditions, however, the stored electrical energy may not be sufficient for propelling movement of the hybrid vehicle. This insufficient power may occur when the hybrid vehicle is operated in a reverse gear and needs to travel up a steep hill. Thus, there is a need in the art for a method/system of managing charging of the batteries to improve performance of the hybrid vehicle during reverse climbing.

SUMMARY

A method/system is provided for managing pre-charging of a battery of a hybrid vehicle to improve hill climb performance when driving in reverse. The method/system determines whether pre-charging is needed based on the vehicle state and environmental conditions. This determination can be based on a grade value (angle) of a hill upon which the vehicle is positioned. The decision as to whether pre-charging is needed can also be based on a state of charge (SOC) value of the battery. The greater the grade value and the lower the SOC value of the battery, the more likely it is that pre-charging would be needed. The system and method may also base this decision on the expected distance that the vehicle will travel in reverse uphill. An electronic control unit (ECU) sets a charging rate and a target charge value based on the foregoing data. An engine of the vehicle produces the required charging energy to be stored in the battery. A message may be displayed to the driver requesting the driver to wait until pre-charging is complete. The engine may pre-charge the battery to be at or above the target charge value. Once the target charge value is reached or exceeded, a message can be displayed to prompt the driver that the vehicle is ready to begin reverse driving uphill.

In an embodiment, a pre-charging system/method is provided for improving reverse direction hill climb performance of a hybrid vehicle. The hybrid vehicle further includes a motor for powering a movement or an operation of the hybrid vehicle using energy stored in a battery of the hybrid vehicle. The hybrid vehicle also includes an engine configured to output power for at least one of driving the hybrid vehicle or charging the battery. A grade sensor may be provided for detecting a grade value of a surface upon which the hybrid vehicle is positioned. A gear selection sensor is configured to detect a gear selection by a driver. An ECU is connected to the sensors and configured to determine whether to activate a pre-charge mode based on the gear selection, the grade value, and the SOC value of the battery. When or after the pre-charge mode is activated, the ECU is configured to determine a target charge value based on the grade value and the SOC value of the battery. The battery is charged using the power outputted by the engine until the SOC value of the battery is equal to or greater than the target charge value.

The ECU may further determine a charging rate for the battery based on the SOC value of the battery and the grade value. The ECU charges the battery at the charging rate until the SOC value of the battery is equal to or greater than the target charge value. The ECU may determine a pre-charge need value based on the grade value and the SOC value of the battery, and activate the pre-charge mode when or after the pre-charge need value is greater than or equal to a pre-charge activation threshold value. A display is provided for displaying a message that pre-charging is completed, and the vehicle is ready for driving in reverse, when the SOC value of the battery is equal to or greater than the target charge value.

The ECU is configured to set the target charge value such that it exceeds an actual charge value needed for reverse driving by a hysteresis margin value. This can ensure that the SOC value does not decrease to a value less than the actual charge value needed for reverse driving during a time lag between display of the message that pre-charging is completed and when the driver starts reverse driving. Another advantage of the present invention is that by determining the vehicle state and environmental conditions, the battery can be effectively pre-charged to ensure that the battery is adequately charged prior to reverse driving. By enhancing reverse driving performance and displaying helpful information to the driver, the present invention helps meet driver expectations of vehicle performance.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention, wherein.

DETAILED DESCRIPTION

The invention relates to a method and a system of managing pre-charging of a battery of a hybrid vehicle to improve reverse direction hill climb performance. The system/method determines whether pre-charging is needed based on the vehicle state and environmental conditions. This determination can be based on a grade value (or an angle) of a surface or hill upon which the vehicle is positioned, as detected by a grade sensor. The determination can also be based on a state of charge (SOC) value of the battery. The higher the grade value of the hill, and the lower the SOC value, the more likely that pre-charging would be required. The system and method may also base this decision on the expected distance that the vehicle will travel in reverse uphill. The system sets a charging rate and a target charge value based on the detected grade value, SOC data, and/or other sensed data. The engine produces the required charging energy to be stored in the battery. A message may be displayed to the driver requesting the driver to wait until pre-charging is complete. The engine may pre-charge the battery to be at or above the target charge value. The target charge value may be set above the actual needed SOC value by a margin for hysteresis. After applying hysteresis, the engine may stop charging the battery. The logic prompts the driver that the vehicle is ready to begin reverse hill climb, for example, by displaying a message.

As will be apparent from the description herein, an advantage of the present invention is that by determining the vehicle state and environmental conditions, the battery can be effectively pre-charged to ensure that the battery is adequately charged prior to reverse driving. By enhancing reverse driving performance and displaying helpful information to the driver, the present invention helps meet driver expectations of vehicle performance.

Figure 1:
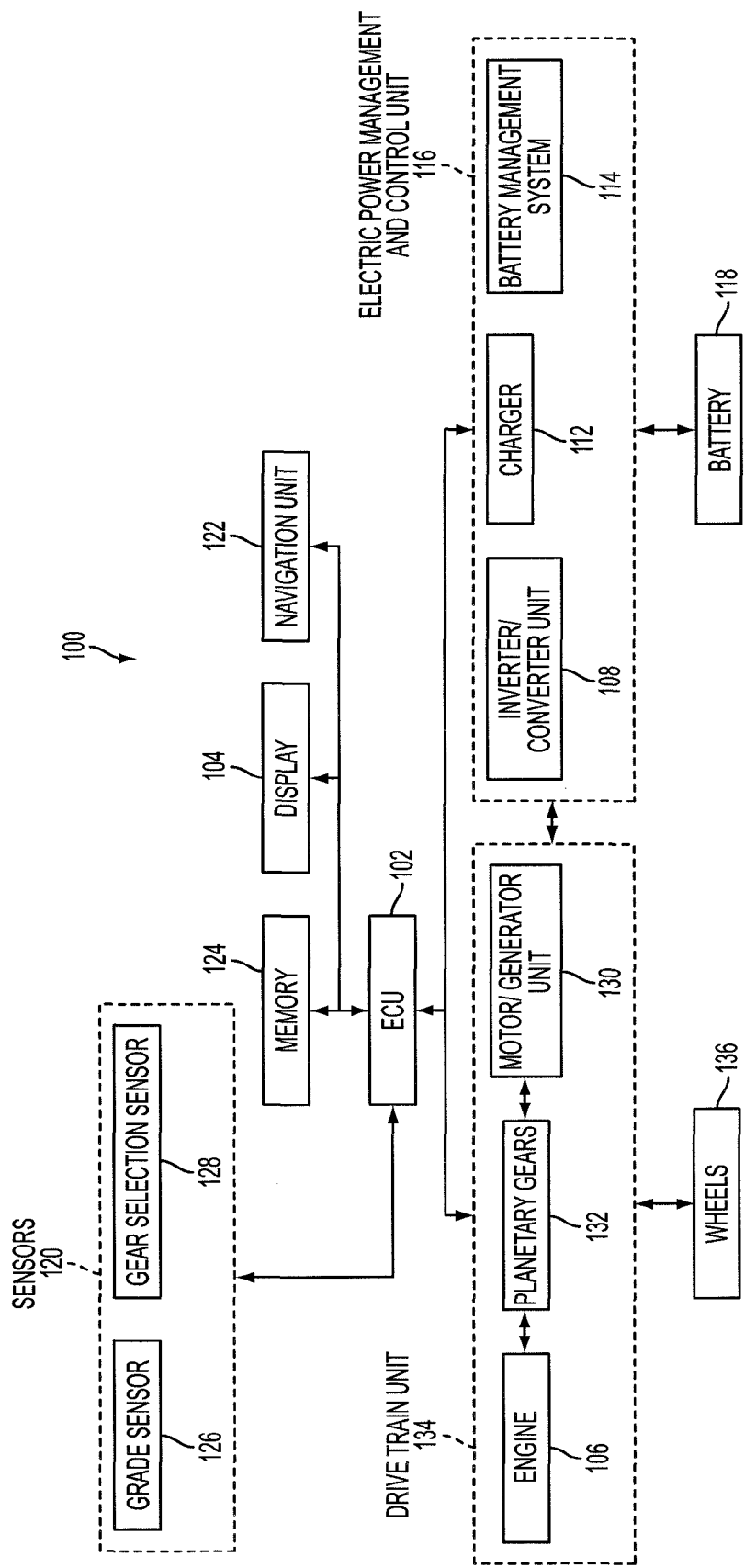
FIG. 1 is a block diagram of a pre-charging system for a hybrid vehicle according to an embodiment of the present invention.

Referring to FIG. 1, a schematic block diagram is shown of a system 100 for managing pre-charging of a battery of a hybrid vehicle. The vehicle may be a hybrid vehicle that operates by utilizing a fuel source and a non-fuel source of energy. The vehicle may be an alternative fuel vehicle, a hybrid electric vehicle, a plug-in hybrid electric vehicle, an electric vehicle, a hydrogen fuel cell vehicle or a solar powered vehicle or any other vehicle utilizing a non-fuel source of energy.

The discussion now turns to an overview of interaction of an electronic control unit (ECU) 102 with units and devices of the vehicle. The ECU 102 includes one or more processors operating in conjunction with one another to control operations of the vehicle. The ECU 102 may be in continuous or periodic communication with various units of the vehicle such as the units shown in FIG. 1. The control and communication may be via transmission of electronic signals through a Control Area Network (CAN) bus. The control and communication may be over various other types of communication links, direct wirings, digital communication buses, wireless communications or other communication links.

The ECU 102 controls operations of the vehicle based on data detected by sensors 120. The sensors 120 include a grade sensor 126 for detecting a grade value of a surface upon which the vehicle is positioned. A grade value can refer to an angle of steepness, for example, in terms of degrees or percentage. The sensors 120 include a gear selection sensor 128 for sensing a transmission gear selection (e.g., reverse, drive, park, neutral) of a user. The gear selection sensor 128 may be located on a transmission selector shaft, steering column mounting, or other locations of the vehicle.

A memory 124 is connected to and/or incorporated in the ECU 102. The memory 124 can store data or instructions for operations of the ECU 102. The memory 124 may store algorithms and look-up tables as discussed in further details below with respect to FIG. 4. The memory 124 may include an on-board storage device and/or off-board memory in communication with the vehicle via wireless communication and/or cloud-based technology.

The ECU 102 may be connected to a display 104. The display 104 may include a dashboard touch-screen display. The display 104 may be a display of a navigation unit 122. The navigation unit 122 may access GPS data for route prediction. The navigation unit 122 may be integrated in the vehicle or a separate unit in communication with the ECU 102.

The discussion now turns to powering operations and movement of the vehicle. An engine 106 is utilized for powering a plurality of wheels 136 and/or for charging the battery (or batteries) 118. Various types of fuel may be used by the vehicle, such as gasoline, diesel, ethanol, biodiesel, natural gas, propane, hydrogen, or combinations thereof. The vehicle may also include a fuel cell in lieu of or in addition to the engine 106 which may charge the battery 118 and/or a capacitor by converting a fuel through a chemical reaction.

Movement of the vehicle and/or operation of its units may be powered, wholly or in part, by electrical power stored in the battery 118. A change in an SOC value of the battery 118 can indicate an electrical consumption rate or amount. A battery management system (BMS) 114 may measure, using battery sensors, parameters that are used to determine the SOC value of the battery 118. The battery sensors may measure a voltage, a current, a temperature, a charge acceptance, an internal resistance, self-discharges, magnetic properties, a state of health and/or other states or parameters of the battery 118. The ECU 102 may determine an SOC percentage or ratio based on an energy value stored in the battery 118 relative to the current charging capacity of the battery 118.

The battery 118 may be coupled to an external charger before departure or driving of the vehicle. The battery 118, as in for example a plug-in hybrid vehicle, may be charged by an energy generation unit. The energy generation unit may include a solar panel, a ram induction generator, a regenerative braking unit, a heat exchange unit or combinations thereof. The vehicle may also include a catalytic converter connected to the engine 106 to generate heat used by the energy generation unit to charge the battery 118. The energy generation unit may charge the battery 118 using a generator and/or a motor-generator of a motor/generator unit 130.

The engine 106 may be connected to the motor/generator unit 130 using planetary gears 132. The motor/generator unit 130, the planetary gears 132, the engine 106, and other power train units form a drive train unit 134. The motors and/or the engine 106 output torque for driving one or more of the wheels 136. The amount of output torque and/or output power supplied by the motors can depend on the amount of output torque and/or output power supplied by the engine 106, and vice versa. A transmission (not shown) can be connected between the drive train unit 134 and the wheels 136.

The drive train unit 134 interacts with an electric power management and control unit (EPMCU) 116. The drive train unit 134 and the EPMCU 116 do not necessarily relate to structural positioning or connections. Rather, the units are grouped in the schematic block diagram to clarify functions of the vehicle for powering the wheels 136, and storing electrical energy. A person skilled in the art would appreciate that there are various ways to connect the devices and units based on design needs and concerns.

The EPMCU 116 may include an inverter/converter unit 108 for powering the motors of the motor/generator unit 130 using electric energy stored in the battery 118. The EPMCU 116 may include a charger 112 for charging the battery using the generators of the motor/generator unit 130 and/or the engine 106. The vehicle may also utilize power provided by the engine 106 and/or regenerated energy for example, using regenerative braking to charge the battery 118.

One or more motor-generators (M-Gs) may be utilized, each serving both as a motor and a generator. That is, under certain conditions, at least one of the M-Gs may use battery power to drive the wheels 136, and under certain other conditions, at least one of the M-Gs may utilize regenerative braking and/or energy generated by the engine 106 to charge the battery 118. In other embodiments, the motors and the generators of the motor/generator unit 130 may be separate physical devices.

The vehicle may include planetary gears 132 that mechanically link the engine 106 and one or more M-Gs (e.g., two M-Gs). The engine 106 can only output torque in one rotational direction. In reverse driving, the torque provided by the engine 106 may oppose the torque required to move the vehicle. As such, when the engine 106 is outputting torque (running), the motors propel reverse movement using electrical energy stored in the battery 118. In the foregoing drive train configuration, the engine torque output would inhibit reverse direction movement.

In other embodiments, the engine torque and the motor torque may supplement one another to propel the vehicle in reverse driving. The engine 106 may be decoupled from the motors such that the engine 106 could propel the wheels directly for reverse driving without the foregoing counter-rotation. Other variations of motors and generators, and drive train connections known in the art can be utilized based on design concerns.

The pre-charging logic may operate the vehicle exclusively in electric vehicle (EV) mode during reverse driving when certain pre-conditions as described herein are met. The pre-conditions are based on the vehicle state and environmental characteristics. The EV mode refers to propelling the vehicle using power entirely or substantially entirely provided by the battery 118.

Figure 2:
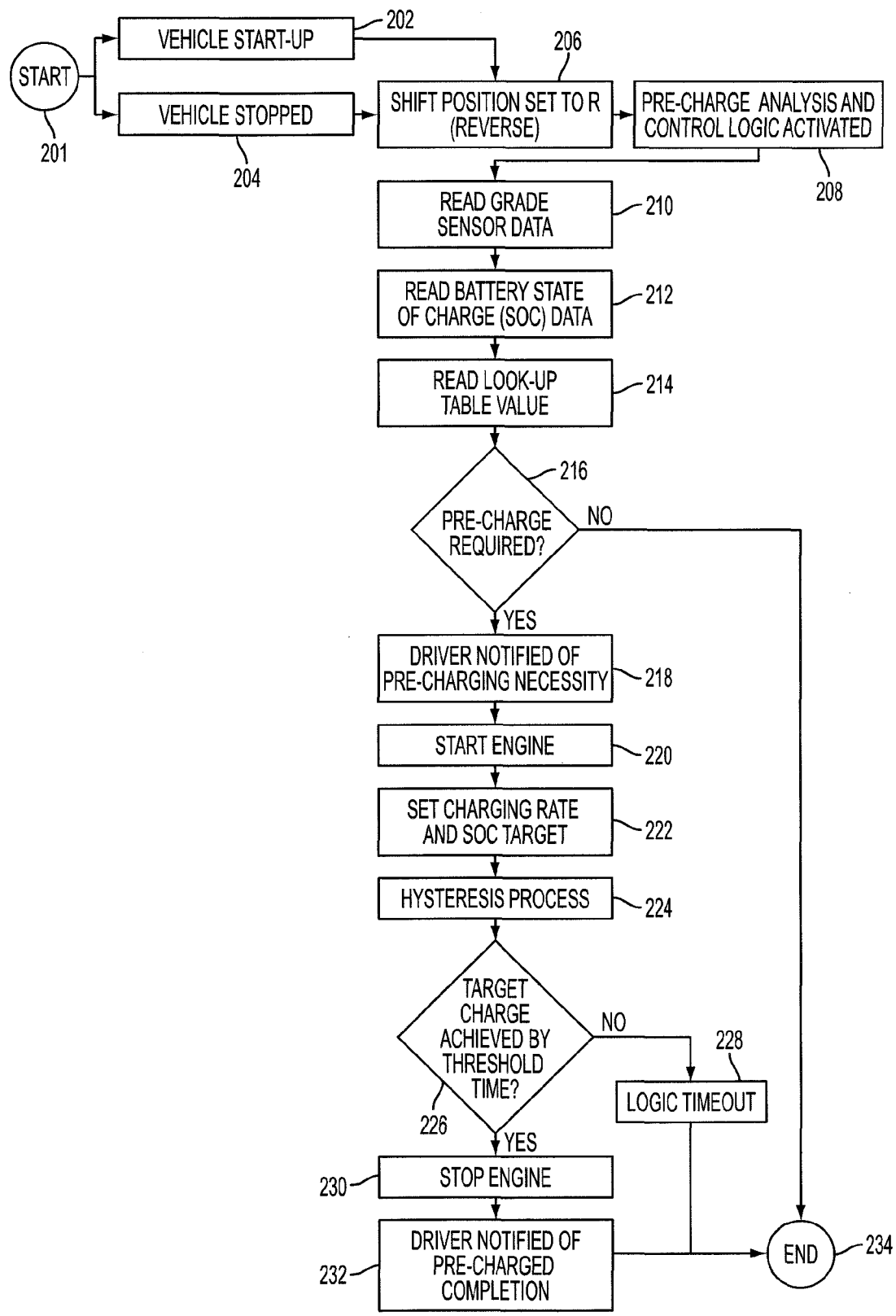
FIG. 2 is a logic flowchart diagram for a method/system of improving reverse direction hill climb performance of a hybrid vehicle according to an embodiment of the present invention.
Figure 3:
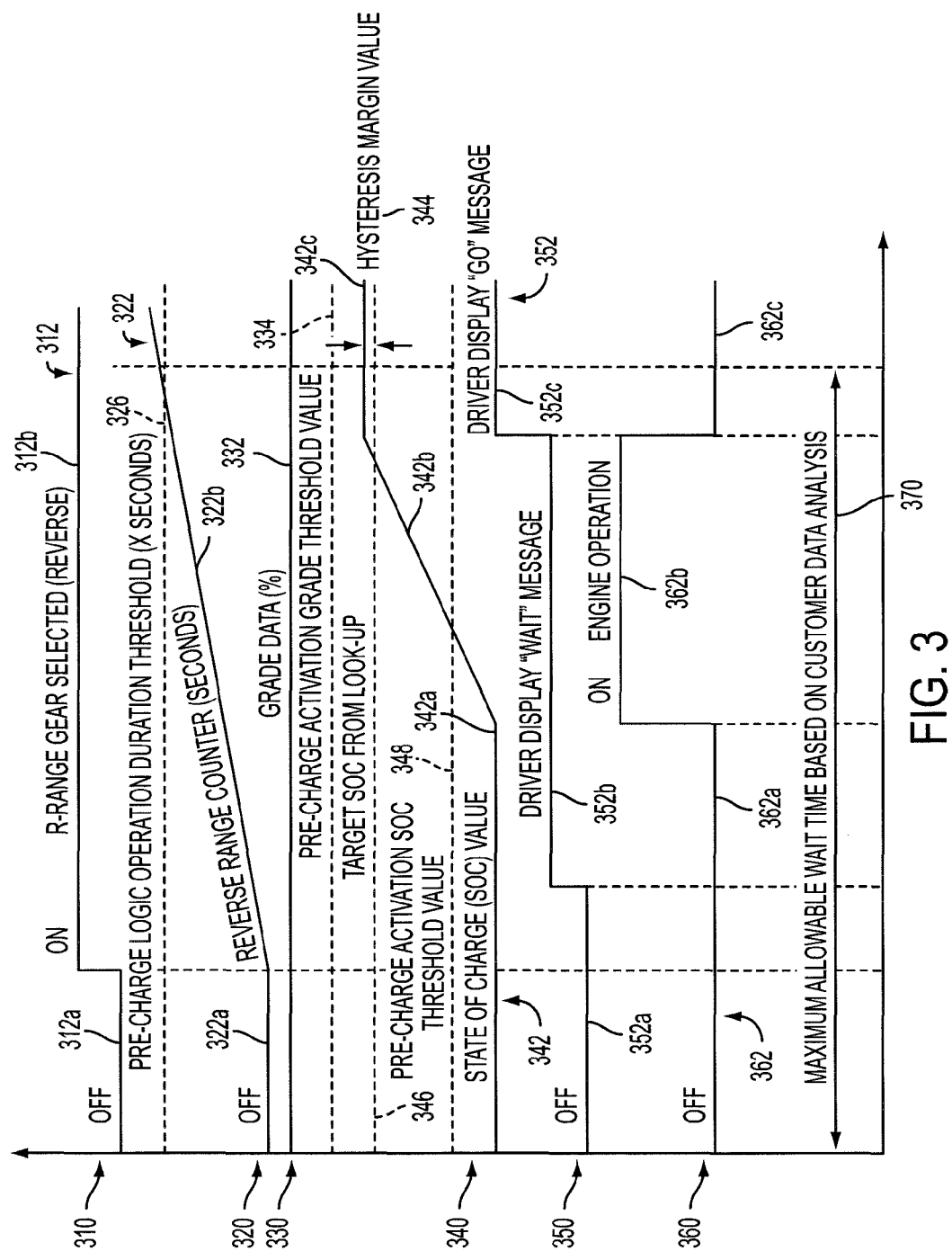
FIG. 3 is a logic operation example of pre-charging a battery of a hybrid vehicle according to an embodiment of the present invention.
Figure 4:
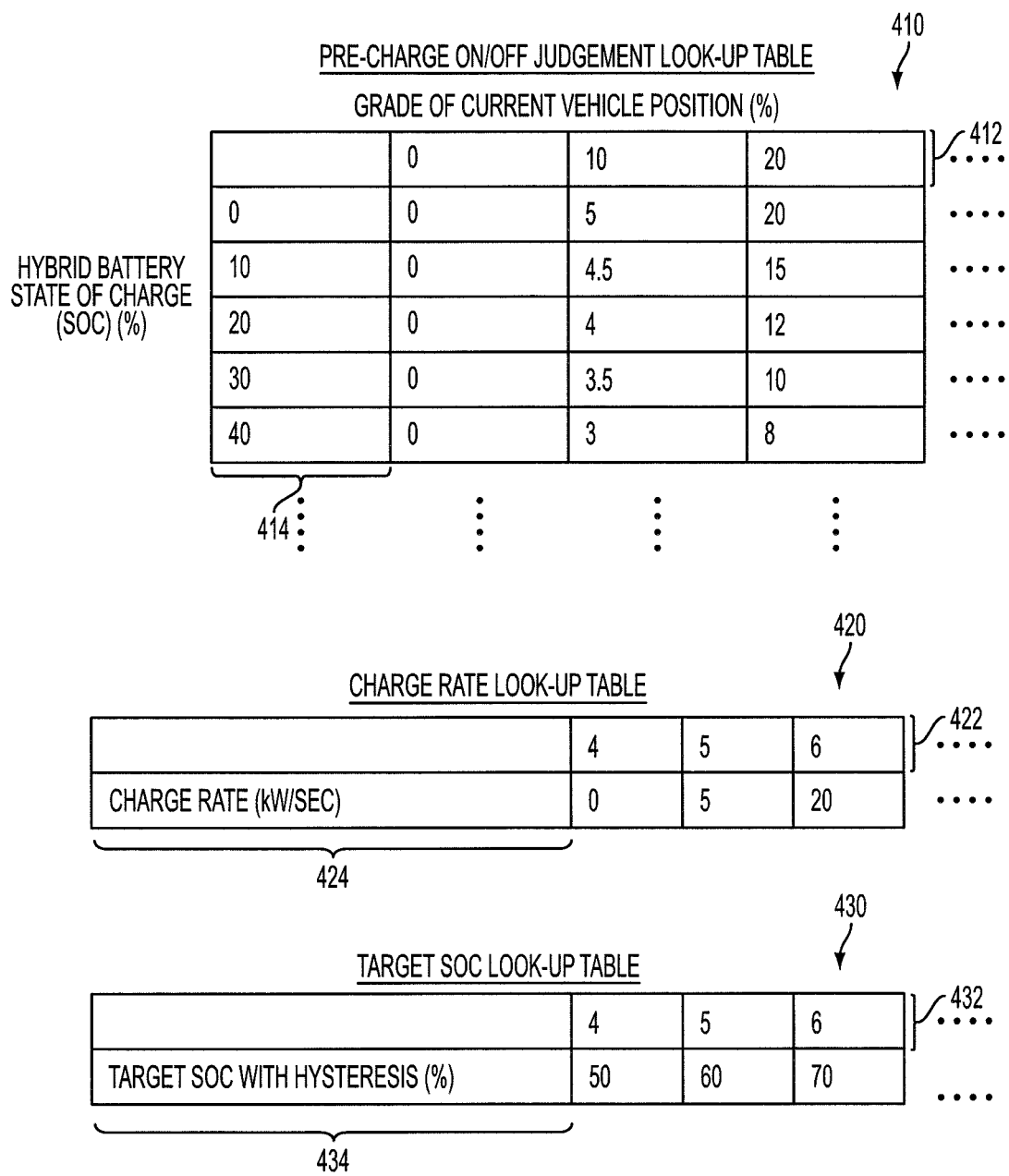
FIG. 4 shows examples of look-up tables that may be used by a reverse drive pre-charge logic according to an embodiment of the present invention.

Examples of operation of the method/system of the present invention are described with respect to FIGS. 2-4. FIG. 2 is a logic flowchart diagram for a method/system of improving reverse direction hill climb performance of a hybrid vehicle. FIG. 3 shows an example of how values of different parameters progress during a pre-charging operation of a battery of a hybrid vehicle. FIG. 4 shows examples of look-up tables that may be used by the pre-charge operation. A person skilled in the art would appreciate that the parameters, values, settings, and/or the illustrated operation in the graph and look-up table may differ based on design concerns and other considerations.

"Pre-charging" and variants thereof as used herein refer to charging the battery 118 to be at an SOC value that is sufficient for powering a movement and/or an operation of units of the vehicle for driving uphill in reverse. Pre-charging can be completed once the SOC value reaches a defined target charge value.

Referring to FIG. 2, the user of the vehicle may select a reverse gear after vehicle start-up (block 202) or after the vehicle is stopped (block 204). In block 206, the ECU 102 determines that the shift position is set to "R" (Reverse) based on data detected by the gear selection sensor 128. A pre-charge analysis and control logic is activated, as shown in block 208, when or after the shift position is set to reverse. If the shift position is not set to reverse, the vehicle's base logic may continue to be operated. At this juncture, activation of the pre-charge analysis and control logic in block 208 does not necessarily indicate that pre-charging will begin. Rather, it signifies a beginning of analyzing detected data as instructed by the reverse driving pre-charge analysis and control logic instead of the base logic.

Referring to FIG. 3, graph 310 shows a state of a reverse gear selection flag 312 over a given time. The reverse gear selection flag 312 is initially in an OFF mode (as shown by 312a), meaning that the gear selection is not reverse. Once the reverse gear is selected as detected by the gear selection sensor 128, the reverse gear selection flag 312 is in an ON mode (as shown by 312b).

A reverse range counter 322 is in an OFF mode (as shown by 322a) when the gear is not in reverse. The reverse range counter 322 is started when the gear selection is in reverse, as indicated by 322b. The reverse range counter 322 can determine whether the logic has timed out before reaching a target charge value, as explained below with respect to block 228.

Referring back to FIG. 2, grade sensor data is detected and read in block 210. The SOC value of the battery 118 is detected and read in block 212. The ECU 102 can determine whether pre-charging is required based on the SOC value and the grade value, and/or other values. In block 214, the ECU 102 uses the determined values and a look-up table stored in the memory 124 to determine a corresponding pre-charge need value.

Exemplary look-up tables for pre-charging determination are shown in FIG. 4. Table 410 shows a look-up table for determining whether pre-charging should be turned on or off. The first row 412 includes grade values of the surface upon which the vehicle is positioned. The grade values are in percentage (%), but may alternatively be expressed in other units such as degrees. The first column 414 includes SOC values of the battery 118. The SOC values are shown in terms of percentage (%) as compared with the capacity of the battery 118. The SOC values may alternatively be expressed in various other units of measuring stored energy. The ECU 102 looks up a pre-charge need value based on the detected SOC value and grade value. If the detected values are in between the values in the first row 412 and the first column 414, the pre-charge need value can be determined by interpolating the data. The interpolation can be performed in two directions: with respect to SOC values as well as with respect to grade values. In this scenario, the interpolation essentially would be performed over a three-dimensional map. The number of significant digits on the sensors can affect the accuracy of the pre-charge need value determined by the interpolation process.

The pre-charge need is greater when the battery has a low SOC value and when the grade value is high because the electrical energy may not be sufficient to reverse drive the vehicle up a hill with a high grade value. As can be seen in table 410, the greatest pre-charge need value corresponds to the value 20. This occurs when the SOC value is the lowest (0%) and the grade percentage is the highest (20%). The ellipses ( . . . ) on the tables indicate that there are additional rows and columns, but a few are shown for illustration purposes.

The pre-charge need value in table 410 may take into account consumer research data that indicates the expected distance to be travelled uphill given the SOC value, the grade value, and/or other factors. Alternatively, another dimension may be added to table 410 for determining the pre-charge need value. The following three inputs amongst other inputs may be considered: the SOC value of the battery 118, the grade value, and the expected distance of reverse driving uphill. The expected distance can be determined by navigation data (e.g., GPS data) provided by the navigation unit 122. More particularly, the navigation data may indicate the expected driving distance of the hill upon which the vehicle is positioned before reaching the destination.

Referring back to FIG. 2, the ECU 102 determines whether a pre-charge mode should be activated in block 216. The ECU 102 may compare the pre-charge need value to a pre-charge activation threshold value. The pre-charge mode can be activated based on the comparison of the pre-charge need value to the pre-charge activation threshold value. Referring to table 410 of FIG. 4, the pre-charge activation threshold value may be four (4) in this example. Pre-charge needs greater than or equal to 4 correspond to severe conditions for reverse driving (as indicated by the SOC value, the grade value, and/or the expected distance of travelling uphill). That is, if the pre-charge need value is greater than 4, the pre-charge mode would be activated. Other values or units for the pre-charge activation threshold value can be set based on design concerns.

Referring to FIG. 3, graph 330 shows the detected grade data in terms of percentage as indicated by 332. The detected grade value is greater than the pre-charge activation grade threshold value 334 for activating the pre-charge mode. Graph 340 shows progression of the SOC value 342 of the battery 118. In this case, the pre-charge mode is activated as the determined conditions indicate that pre-charge need is high. More particularly, as can be seen from graphs 310, 330, and 340, the following pre-conditions for activation are met: (a) the driving gear is in reverse (312b), (b) the grade value 332 is greater than the pre-charge activation grade threshold value 334, and (c) the initial SOC value before pre-charging (342a) is less than the pre-charge activation SOC threshold value 348.

Referring to block 218 of FIG. 2, the driver is notified of pre-charging necessity. The ECU 102 directs the display 104 to display a message, an image and/or a video. The display can indicate that pre-charging is in progress and prompt the driver to wait until pre-charging is complete before reverse driving up the hill. In addition or alternatively, an audio message may be outputted using a speaker of the vehicle.

Referring to FIG. 3, display graph 350 shows that the pre-charging display 352 is in an OFF state (352a) initially. Once the pre-charging mode is activated, a "wait" message is displayed for the driver, as shown by 352b.

Referring to FIG. 2, the engine 106 is started in block 220 to charge the battery 118. The engine 106 may drive a generator of the motor/generator unit 130 to charge the battery 118. The generator may be a motor-generator (M-G) and/or a generator that is separate from the motor.

Referring to FIG. 3, the SOC value 342 is increased using engine output power. As shown by graph 360, the engine operation 362 may initially be in an OFF state as shown by 362a. The engine operation is set to ON (362b) which powers the battery 118 using a generator of the motor/generator unit 130.

Referring to block 222 of FIG. 2, a charging rate and a target charge value are set. The battery 118 is charged at the charging rate until the target charge value reaches and exceeds the target charge value. In block 224, a hysteresis process is applied. The target charge value is set to exceed the actual SOC value needed for reverse driving by a hysteresis margin value. The hysteresis process is explained in further details with respect to FIGS. 3 and 4.

Referring to FIG. 4, the charging rate can be set, for example, in kW/sec (kilo Watts per second) using a look-up table 420. The charging rate can be set based on the detected grade value and the SOC value of the battery 118. The charging rate can be set based on the pre-charge need value (which is based on the grade value and the SOC value). The pre-charge need values 422 are listed in a row, having corresponding charging rates 424. The charging rate can be interpolated in one direction if the pre-charge value is in between the stored pre-charge values. Alternatively, a multi-dimensional table can be set up similar to table 410, except with the look-up values in the body of the table being the charging rate instead of the pre-charge need value. In other words, the charging rate can be determined directly based on the grade value and the SOC value.

The pre-charge need value indicates the severity of conditions for reverse driving. The charging rate 424 is set to be high when the pre-charge need value 422 is high. The charging rate 424 may be set such that the duration of pre-charging is substantially the same independently of the grade value of the hill. An advantage of fixing the charging time is that the driver would be satisfied with the use of pre-charging mode when he or she expects the same wait time for pre-charging.

Alternatively, the charging rate can be fixed instead of the pre-charging time. In a scenario where pre-charge need is low, the ECU 102 can charge the battery 118 to reach the target charge value in a shorter amount of time. When the charging rate is fixed, the duration of the pre-charge operation until a target charge value is reached may depend on the SOC value, but not the detected grade value. The charging rate can be set based on the maximum amount of wait time. The maximum amount of wait time can be determined based on a scenario having the greatest pre-charge need. The pre-charge time would be variable depending on the grade value and the SOC value. An advantage of fixing the charging rate is that the battery 118 can be damaged when varying the charging rate. By having a steady fixed charging rate for different conditions with different grade and SOC values, the usable life of the battery 118 can be extended.

Alternatively, the pre-charging rate and the pre-charge duration to reach the target charge value may both vary and be set dynamically based on the sensed parameters. The sensed parameters may be the SOC value, the grade value, the expected distance of reverse driving uphill, and/or other factors.

As shown in table 430, a target charge value 434 can be determined based on the pre-charge need value 432. The target charge value 434 may take into account power needed by auxiliary units of the vehicle such as a heating, ventilation and air conditioning (HVAC) unit. The target charge value 434 can be set such that it exceeds an actual charge value needed for reverse driving by a hysteresis margin value.

One reason for providing a hysteresis margin value is that during a time lag between the time that a display message is displayed and the driver depresses the gas pedal, the SOC value may drop below the actual charge value needed for reverse driving. A hysteresis margin value can be predetermined based on an expected decrease in the SOC value during the time lag. The expected decrease in the SOC value can be based on an average electrical energy consumption of the vehicle. The expected decrease in the SOC value can also be based on the average time a user takes from the time he or she sees the wait message to the time he or she depresses the gas pedal.

Another advantage of the hysteresis process is that the margin value prevents the pre-charge mode from deactivating and re-activating. The hysteresis margin value ensures that the SOC value does not drop below the actual charge value needed for reverse driving, which could undesirably lead to re-activation and deactivation of the pre-charge mode.

Alternatively, the hysteresis margin value can be dynamically set based on sensed parameters. The ECU 102 may be connected to various auxiliary devices of the vehicle and can estimate electrical consumption values or rates. Based on the electrical consumption rates or values, the ECU 102 can determine a battery load value. The ECU 102 can set the hysteresis margin value based on the battery load value to ensure that the SOC value does not drop below the target charge value after display of the wait message and before uphill reverse driving. An HVAC unit can exert a significant amount of battery load during heavy heating or cooling of the vehicle. The ECU 102 can set the hysteresis margin value to be high when the sensed battery load is high. The ECU. 102 may utilize a look-up table to determine an actual charge value needed for reverse driving, and another look-up table to determine a hysteresis margin value based on the battery load. The ECU 102 may add the two values to set the target charge value. Alternatively, a multi-dimensional look-up table can be used to directly set the target charge value based on the grade value, the SOC value, and the battery load. One skilled in the art would appreciate that other calculations and look-up tables can be utilized to set the target charge value based on the parameters envisioned here: the SOC value, the grade value, the expected distance of reverse driving uphill, the battery load, and/or other factors.

Referring to FIG. 3, the SOC value 342 is initially at 342*a* before activation of the pre-charging mode. The SOC value 342 is increased at a constant charging rate as shown by 342*b* until the SOC value 342 reaches a target charge value 342*c*. The target charge value 342*c* exceeds the actual charge value needed for reverse driving by a hysteresis margin value 344.

Referring to block 226 of FIG. 2, the ECU 102 determines whether the target charge value is reached before a threshold time period has passed. If not, the pre-charge mode times out as shown in block 228. This results in de-activation of the pre-charge analysis and control logic ("END" 234). The base logic can be re-activated at this juncture. If the pre-charge mode has not timed out, and the target charge value is read within the allowed time, the process proceeds to block 230.

Referring to FIG. 3, a pre-charge logic operation duration threshold 326 can be set, for example, in terms of seconds. Once the reverse range counter 322*b* reaches or exceeds the pre-charge logic operation duration threshold 326, the logic times out. At time-out, a message can be displayed, indicating that that the battery 118 was not sufficiently pre-charged. The message may further indicate that the driver may proceed with driving. A reason for using a time-out counter is that a driver would prefer not to wait too long for pre-charging. The pre-charging logic takes this concern into account by prompting the user to advance with reverse driving when the duration of the pre-charging process exceeds a pre-charge logic operation duration threshold.

The process may be designed such that ideally the overall wait time is within the maximum allowable wait time 370. Referring to FIG. 2, the overall wait time begins from the time the process starts in block 201. The time window considered for time-out analysis and the maximum allowable wait time could be set differently based on design concerns and consumer data analysis. Consumer data analysis indicates typical consumer expectations of reasonable wait time. If the maximum allowable wait time 370 is exceeded, the logic times out as discussed above with respect to blocks 226 and 228 of FIG. 2.

Referring back to FIG. 2, once the target charge value is reached, the engine 106 is stopped (block 230). The engine 106 would no longer charge the battery 118. The engine 106 may indeed shut down at this juncture. Referring to FIG. 3, the engine operation 362 may be set to an OFF state and transition from 362*b* to 362*c*. This occurs when or after the SOC value 342 reaches the target charge value 342*c*. During the engine operation 362*b*, the engine 106 produces the required charging energy to be stored in the battery 118 as the vehicle remains stopped.

Referring to FIG. 2, the driver can be notified of pre-charge completion in 232. An image, video, and/or a text may be displayed using the display 104, indicating that the driver can start reverse driving up-hill. Referring to FIG. 3, the display graph 350 shows that the display can move from the wait message 352*b* to "Go" message 352*c* once the target charge value is reached. The "Go" (or "Go when Safe") message may be a message displayed, indicating to the driver that pre-charging is completed and the hybrid vehicle is ready for driving in reverse.

In certain environments, the grade value (or angle) may vary significantly in the hill climb. A drawback with significant variation of the grade value is that the initial estimation for the target charge value may not be accurate if the initial estimation considered only the initial grade value.

Figure 5:
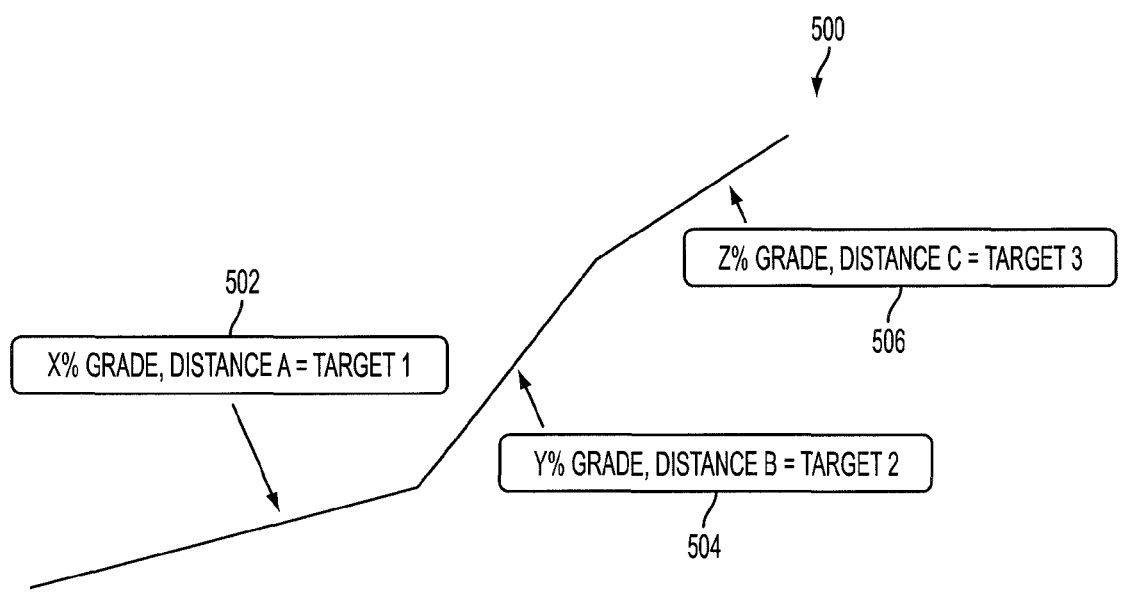
FIG. 5 is a graph showing an example of how target charge values can be determined when the grade values of the surfaces vary over the expected reverse direction hill climb distance according to an embodiment of the present invention.

FIG. 5 is a graph showing grade value variations of the over the expected reverse direction hill climb route. In section 502, over a distance (A), the grade value is initially X percent (%). Over the next distance (B) in section 504, the grade value increases to Y %. The grade value subsequently increases to Z % over a distance C in section 506. The ECU 102 and/or another processor (e.g., processor of the navigation unit 122) can determine the grade values and the corresponding distance values based on the navigation data. The ECU 102 may determine a first target charge value (noted by "target 1" in section 502) based on the grade value of section 502 (X %), the current SOC value, distance A of section 502, and/or other factors as discussed above with respect to FIG. 2. Similarly, a second target charge value (noted by "target 2" in section 504) can be determined based on the grade value of section 504 (Y %), the current SOC value, the distance B of section 504, and/or other factors as discussed above with respect to FIG. 2. A third target charge value (target 3) can also be determined similarly based on distance C, corresponding grade value (Z %), current SOC value, and/or other factors. The overall target charge value can be set by summing the target charge values for each section (target 1+target 2+target 3+ . . . ). Alternatively, the overall target charge value can be directly determined by taking into account distance A, X %, distance B, Y %, distance C, Z %, current SOC value, and/or other parameters.

Although three sections are shown in this example, it can be appreciated that a different number of sections could be present depending on the particular reverse driving route. The number of sections may also depend on the logic's defined sensitivity to grade value, distance, and/or other parameters. More particularly, the sensitivity can be defined based on a minimum distance variation threshold, a minimum grade value variation threshold, and/or other factors or parameters. By defining sensitivity thresholds, the determination of target charge values can be simplified without significantly affecting the accuracy of the target charge value. That is, if the grade value varies by a very small percentage over a negligible distance in a section, the logic would ignore such variation and not separate it into a different section.

Grade value variations may be taken into account only if the condition becomes more severe uphill (that is, the grade value increases). This reduces the likelihood that the SOC value of the battery 118 becomes insufficient for reverse driving once the grade value increases. When the grade values decrease, conditions become less severe. The decreases in the grade value may be ignored in this implementation. A reason for ignoring the grade value decline is that the original estimation would merely result in storage of excess charge beyond what is needed for reverse driving. Assume the grade value changes from 5% to 10% and then to 8%. The logic would take into account the 5% to 10% change. The logic would ignore the 10% to 8% change and continue to determine the target charge value based on the preceding 10% rate. In alternative implementations, both increases and decreases can be taken into account when determining the overall target charge amount. This would increase the accuracy of the initial estimation of the overall target charge amount.

Similarly, the following steps can also take into account the expected variations of the grade values in advance based on the navigation data: (a) determination of a pre-charge need value (e.g., Table 410 of FIG. 4); (b) activation of the pre-charge mode (e.g., blocks 214 and 216 of FIG. 2); and/or (c) determination of the charging rate (e.g., block 222 of FIG. 2).

Figure 6:
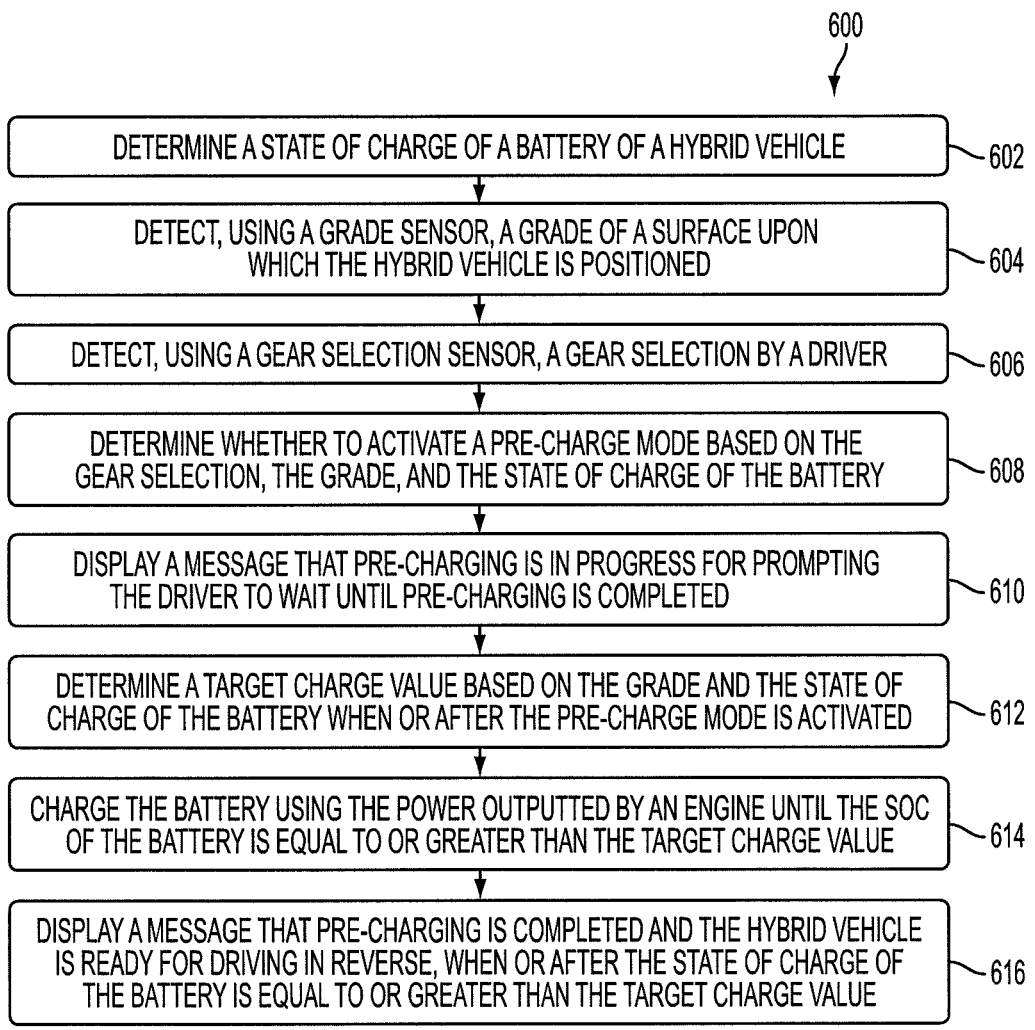
FIG. 6 is a flowchart diagram of a pre-charge method for improving reverse direction hill climb performance of a hybrid vehicle according to an embodiment of the present invention.

FIG. 6 is a flowchart diagram for a method 600 of improving the reverse direction hill climb performance of a hybrid vehicle. In block 602, an SOC value of the battery 118 is determined. This may be a current SOC value of the battery before pre-charging. In block 604, a grade value of a surface upon which the hybrid vehicle is positioned is detected using a grade sensor 126. In block 606, a gear selection by a driver of the vehicle is detected using a gear selection sensor 128. The gear selection sensor 128 may be located on a transmission selector shaft, steering column mounting, or other locations of the vehicle to sense a transmission gear selection.

In block 608, the ECU 102 determines whether to activate a pre-charge mode based on the gear selection, the grade value, and the SOC value of the battery 118. If and when the gear selection, the grade value, the SOC value, and/or other parameters indicate that pre-charging is needed for reverse driving, the ECU 102 activates the pre-charge mode. In block 610, the display 104 displays a message that pre-charging is in progress and the driver should wait until pre-charging is completed. In block 612, the ECU 102 determines a target charge value based on the grade value and the SOC value of the battery when or after the pre-charge mode is activated. The target charge value determination can take into account variations of the grade value as discussed above with respect to FIG. 5. In block 614, the engine 106 outputs power to charge the battery until the SOC value of the battery is equal to or greater than the target charge value. In block 616, the display 104 displays a message that pre-charging is completed and the hybrid vehicle is ready for driving in reverse. This message is displayed when or after the SOC value of the battery is equal to or greater than the target charge value.

An advantage of the present invention is that by determining the vehicle state and environmental conditions, pre-charging can be performed. The vehicle may operate in EV mode throughout the hill climb in reverse. This would help meet customer expectations.

In addition to the logic described above, a route prediction logic may be applied to expect that pre-charging would be required prior to arriving at the hill. If the route prediction is available, the ECU 102 can manage charging and discharging of the battery such that sufficient SOC value remains when the user arrives at the given hill.

The steps described above with respect to FIGS. 2 and 6 may not necessarily be performed in the order presented above. A person skilled in the art would appreciate that, for example, the following steps do not necessarily be performed in different orders: displaying a wait message, setting a target charge value, and determining a charging rate.

While only certain presently embodiments of the invention have been described in detail, a person skilled in the art would appreciate that certain changes and modifications may be made in the embodiments without departing from the spirit and scope of the invention. A person skilled in the art would appreciate the invention may be practiced other than as specifically described with respect to the foregoing embodiments of the method/system.

What is claimed is:

1. A pre-charging system for improving reverse direction hill climb performance of a hybrid vehicle, comprising:
    a battery having a state of charge value;
    a motor for powering a movement or an operation of the hybrid vehicle using energy stored in the battery;
    an engine configured to output power for at least one of driving the hybrid vehicle or charging the battery;
    a grade sensor for detecting a grade value of a surface upon which the hybrid vehicle is positioned;
    a gear selection sensor for detecting a gear selection by a driver; and
    an electronic control unit configured to determine whether to activate a pre-charge mode based on the gear selection, the grade value, and the state of charge value, and when or after the pre-charge mode is activated, the electronic control unit is configured to:
        determine a target charge value based on the grade value and the state of charge value, and
        charge the battery using power outputted by the engine until the state of charge value is equal to or greater than the target charge value.

2. The pre-charging system of claim 1, wherein the electronic control unit is further configured to determine a charging rate for the battery based on the grade value and the state of charge value, and further configured to charge the battery at the charging rate until the state of charge value is equal to or greater than the target charge value.

3. The pre-charging system of claim 1, wherein when or after the gear selection sensor detects a reverse gear selection, the electronic control unit is configured to determine a pre-charge need value based on the grade value and the state of charge value, and activate the pre-charge mode when the pre-charge need value is greater than or equal to a pre-charge activation threshold value.

4. The pre-charging system of claim 1, further comprising a memory configured to store:
    a plurality of pre-charge need values, each pre-charge need value having a corresponding state of charge value stored in the memory and a corresponding grade value stored in the memory, and
    a pre-charge activation threshold value,
wherein the electronic control unit is further configured to:
    determine a pre-charge need value based on the stored plurality of pre-charge need values, and the detected grade value and the state of charge value, and
    activate the pre-charge mode when the pre-charge need value is greater than or equal to the pre-charge activation threshold value.

5. The pre-charging system of claim 4, wherein the electronic control unit is further configured to determine a charging rate for the battery based on the pre-charge need value, and charge the battery at the charging rate until the state of charge value is equal to or greater than the target charge value.

6. The pre-charging system of claim 1, further comprising a display connected to the electronic control unit, and configured to display:
    a message that pre-charging is in progress for prompting the driver to wait until pre-charging is completed before driving in reverse, and
    a message that pre-charging is completed, when or after the state of charge value is equal to or greater than the target charge value.

7. The pre-charging system of claim 6, wherein the electronic control unit is configured to set the target charge value to exceed an actual charge value needed for reverse driving by a hysteresis margin value for ensuring that the state of charge value does not decrease to a value less than the actual charge value needed for reverse driving during a time lag before the driver of the hybrid vehicle starts reverse driving the hybrid vehicle.

8. The pre-charging system of claim 7, wherein the hysteresis margin value is predetermined based on an average electrical energy consumption during an average time lag before the driver of the hybrid vehicle starts reverse driving the hybrid vehicle.

9. The pre-charging system of claim 7, wherein the electronic control unit is configured to determine a battery load value based on an electrical consumption value or rate of one or more auxiliary devices of the hybrid vehicle, and determine the hysteresis margin value based on the battery load value.

10. The pre-charging system of claim 1, further comprising a navigation unit for providing navigation data of a surrounding environment of the hybrid vehicle,
wherein the electronic control unit is further configured to determine an expected distance of reverse driving uphill based on the navigation data, and the target charge value is further based on the expected distance of reverse driving uphill.

11. The pre-charging system of claim 1, further comprising a navigation unit for providing navigation data of a surrounding environment of the hybrid vehicle,
wherein the electronic control unit is further configured to:
determine a first expected distance of reverse driving uphill and a first grade value corresponding to the first expected distance grade value based on the navigation data,
determine a second expected distance of reverse driving uphill and a second grade value corresponding to the second expected distance based on the navigation data, and
determine the target charge value based on the first expected distance, the first grade value, the second expected distance, and the second grade value.

12. A pre-charging system for improving reverse direction hill climb performance of a hybrid vehicle, comprising:
a battery having a state of charge value;
a motor for powering a movement or an operation of the hybrid vehicle using energy stored in the battery;
an engine configured to output power for at least one of driving the hybrid vehicle or charging the battery;
a grade sensor for detecting a grade value of a surface upon which the hybrid vehicle is positioned;
a gear selection sensor for detecting a transmission gear selection;
an electronic control unit configured to determine whether to activate a pre-charge mode based on the gear selection, the grade value, and the state of charge value, and when or after the pre-charge mode is activated, the electronic control unit is configured to:
determine a target charge value based on the grade value and the state of charge value,
determine a charging rate for the battery based on the state of charge value and the grade value, and
charge the battery at the charging rate until the state of charge value is equal to or greater than the target charge value; and
a display connected to the electronic control unit, and configured to display a message that pre-charging is completed and the hybrid vehicle is ready for driving in reverse, when or after the state of charge value is equal to or greater than the target charge value.

13. The pre-charging system of claim 12, wherein in response to detection of a reverse gear selection by the gear selection sensor, the electronic control unit is configured to determine a pre-charge need value based on the grade value and the state of charge value, and activate the pre-charge mode when or after the pre-charge need value is greater than or equal to a pre-charge need value.

14. The pre-charging system of claim 12, wherein the electronic control unit is configured to set the target charge value to exceed an actual charge value needed for reverse driving by a hysteresis margin value for ensuring that the state of charge value does not decrease to a value less than the actual charge value needed for reverse driving during a time lag before the driver of the hybrid vehicle starts reverse driving the hybrid vehicle.

15. A pre-charging method for improving reverse direction hill climb performance of a hybrid vehicle having an engine, a motor, and a battery with a state of charge value, comprising:
detecting, using a grade sensor, a grade value of a surface upon which the hybrid vehicle is positioned;
detecting, using a gear selection sensor, a gear selection by a driver;
determining, using an electronic control unit, whether to activate a pre-charge mode based on the gear selection, the grade value, and the state of charge value;
determining, using the electronic control unit, a target charge value based on the grade value and the state of charge value when or after the pre-charge mode is activated; and
charging the battery using power outputted by the engine until the state of charge value is equal to or greater than the target charge value.

16. The pre-charging method of claim 15, further comprising determining, using the electronic control unit, a charging rate for the battery based on the state of charge value and the grade value,
wherein the step of charging the battery includes charging the battery at the charging rate until the state of charge value is equal to or greater than the target charge value.

17. The pre-charging method of claim 15, further comprising:
determining, using the electronic control unit, a pre-charge need value based on the grade value and the state of charge value; and
activating, using the electronic control unit, the pre-charge mode when or after the pre-charge need value is greater than or equal to a pre-charge activation threshold value.

18. The pre-charging method of claim 15, further comprising:
displaying, using a display connected to the electronic control unit, a message that pre-charging is in progress for prompting the driver to wait until pre-charging is completed; and
displaying, using the display, a message that pre-charging is completed and the hybrid vehicle is ready for driving in reverse, when or after the state of charge value is equal to or greater than the target charge value.

19. The pre-charging method of claim 15, wherein the step of determining, using the electronic control unit, the target charge value includes setting the target charge value to exceed an actual charge value needed for reverse driving by a hysteresis margin value for ensuring that the state of charge value does not decrease to a value less than the actual charge value needed for reverse driving the hybrid vehicle.

20. The pre-charging method of claim 19, further comprising:
- determining, using the electronic control unit, a battery load value based on an electrical consumption value or rate of one or more auxiliary devices of the hybrid vehicle; and
- determining, using the electronic control unit, the hysteresis margin value based on the battery load value.

* * * * *